United States Patent [19]

Blouin et al.

[11] 4,072,054
[45] Feb. 7, 1978

[54] COMBINED PACIFYING NIPPLE AND MOUTH THERMOMETER DEVICE

[76] Inventors: Michel Blouin, 2815 des Pruches St., Orsainville, Canada, GEG 2B2; Leo Mercier, 1778 Bergemont St., Quebec, Canada, 3

[21] Appl. No.: 665,241
[22] Filed: Mar. 9, 1976
[51] Int. Cl.² .......................... G01K 5/04; G01K 1/14
[52] U.S. Cl. .................................. 73/343 R; 73/374; 128/2 H
[58] Field of Search ............. 73/343 R, 374; 128/2 H, 128/360

[56] References Cited

U.S. PATENT DOCUMENTS

| 1,729,298 | 9/1929 | Stewart | 73/374 |
| 2,302,640 | 11/1942 | Schmidt | 73/374 |
| 3,117,450 | 1/1964 | Hoy | 73/374 |
| 3,913,402 | 10/1975 | Doyle | 73/343 R |

FOREIGN PATENT DOCUMENTS

| 903,008 | 9/1945 | France | 128/360 |
| 227,569 | 1/1925 | United Kingdom | 73/343 R |

Primary Examiner—Richard C. Queisser
Assistant Examiner—John S. Appleman

[57] ABSTRACT

A device consisting in a combination of a pacifying nipple and a mouth thermometer and particularly constructed to enclose the thermometer and avoid breakage thereof and to allow easy disassembly. This combined pacifying nipple and mouth thermometer device comprises a thermometer tube forming a temperature display main portion and a liquid bulb portion at one end of the main portion, an elastic protection sleeve tightly engages over the thermometer tube near said one end thereof, a pacifying nipple defining a mouthpiece portion and a lip abutment flange, the mouthpiece portion being engaged over the elastic protection sleeve, and having an annular external bead, the abutment flange being clamped against the annular bead, and a transparent tubular cover removably engaging over the temperature display portion and releasably secured to the lip abutment flange.

1 Claim, 4 Drawing Figures

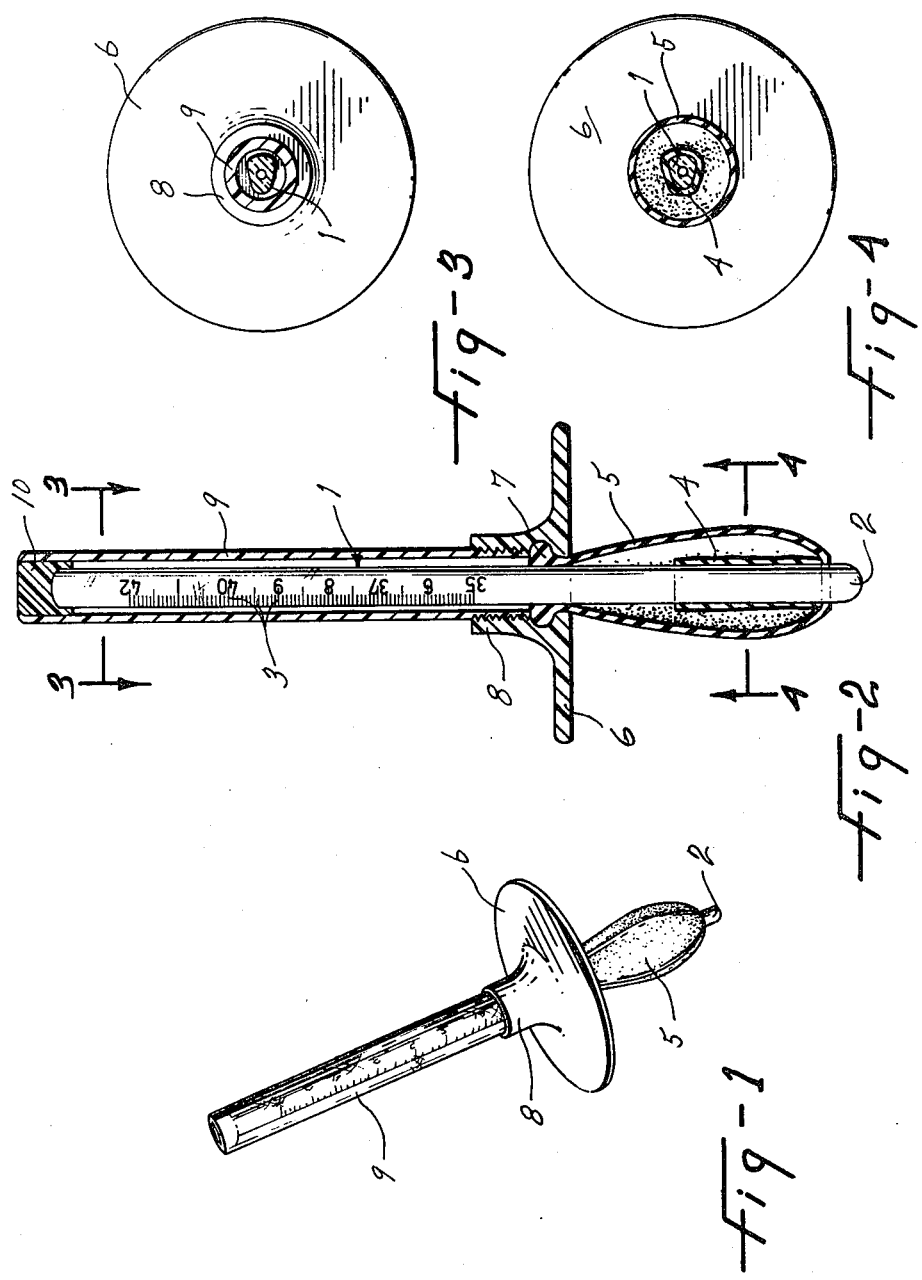

COMBINED PACIFYING NIPPLE AND MOUTH THERMOMETER DEVICE

This invention relates to a medical thermometer and, more particularly, to a mouth thermometer device of the type adapted for an infant and including a pacifying nipple in combination with the thermometer.

Others have proposed some combined pacifying nipple and mouth thermometer devices of the above type but these prior devices are not found satisfactory in either construction, operation or both. In particular, the thermometer tube is not protected against breakage, such as by dropping on the floor, and the components are not easy to disassemble from each other for cleaning and replacement thereof.

It is a general object of the present invention to provide a combined pacifying nipple and mouth thermometer device of the above type, which is well protected against breakage and thus is safer for the infant than the previous devices of this type.

It is another general object of the present invention to provide a combined pacifying nipple and mouth thermometer device of the above type, which may be easily disassembled for cleaning and replacement of any component thereof.

The above and other objects and advantages of the present invention will be better understood with the following detailed description of a preferred embodiment thereof which is illustrated, by way of example, in the accompanying drawings, in which:

FIG. 1 is a perspective view of a combined pacifier and mouth thermometer device according to the present invention;

FIG. 2 is a longitudinal section of the device of FIG. 1; and

FIGS. 3 and 4 are cross-sectional views as seen along lines 3—3 and 4—4 respectively in FIG. 2.

The illustrated combined pacifying nipple and mouth thermometer device includes a mouth thermometer having a liquid thermometer tube 1 formed of a temperature displaying main portion and a liquid bulb portion 2 at one end of the main portion. The temperature displaying main portion is identified by a temperature scale 3 extending longitudinally of the thermometer tube 1.

An elastic protection sleeve 4, of rubber or the like material, is tightly and removably engaged over the thermometer tube at the same end thereof as the liquid bulb portion 2. It must be noted that the sleeve 4 ends short of the corresponding end of the thermometer tube 1.

A pacifying nipple is secured to the thermometer tube and includes a flexible mouthpiece portion, or element 5, and a lip abutment flange 6 which are both centrally apertured for insertion over the thermometer tube 1. The outer end of the mouthpiece portion 5 is also formed with a central aperture, such that the liquid bulb portion 2 projects therefrom to directly contact the infant's tongue and thus obtain a quicker and more accurate reading of the infants's temperature. The marginal portion of the outer end of mouthpiece 5, around its central aperture, frictionally fits around tube 1. It also abuts against the outer end of elastic sleeve 4 to prevent sliding of said mouth piece outer end inwardly along thermometer tube 1 and resultant deformation of mouthpiece portion 5.

The inner end of the mouthpiece portion 5 is formed with an annular external bead 7, which is axially restrained by the lip abutment flange 6 and tightly engaged around the thermometer tube 1. Because the inner end of mouthpiece portion 5 is tightly engaged around thermometer tube 1, the outer end of mouthpiece portion 5 cannot, in practice, be pulled out of engagement with the thermometer tube 1, even if the mouthpiece portion 5 is somewhat elastic, as is usually the case. The lip abutment flange 6 is formed with a cylindrical axial projection 8 which is internally threaded.

A protector tube 9, of transparent plastic, is threadably engaged in the cylindrical projection 8 and protectively surrounds the temperature display main portion of the thermometer tube 1. Bead 7 is tightly engaged around thermometer tube 1 by action of protector tube 9 abutting against bead 7. The protector tube 9 is laterally spaced from the thermometer tube and is longitudinally coextensive with the temperature scale 3 marked along the rectilinear thermometer tube. A plug 10 closes the outer end of the protector tube 9 and is formed with a cavity receiving the outer end of the thermometer tube 1 to center the latter relative to the protector tube.

The pacifying nipple is slidably engaged over the thermometer tube. Thus, the protector tube 9 may be unscrewed and the flexible sleeve 4, the mouthpiece portion 5 can the lip abutment flange may be slid off the thermometer tube 1 to completely free the component from each other, such as for cleaning or replacement of any part.

This invention is an improvement over the "COMBINED PACIFYING NIPPLE AND MOUTH THERMOMETER DEVICE" described in our own United States Pat. No. 3,968,690, dated July 13, 1976.

What we claim is:

1. A combined pacifying nipple and mouth thermometer device comprising a liquid thermometer tube including a temperature displaying main portion and a liquid bulb portion at one end of the main portion, a flexible pacifying nipple including a flexible tubular mouth-piece portion having an outer end and an inner end, a lip abutment flange fixed to said inner end and surrounding the same, the outer end and the inner end of said mouthpiece portion both having apertures aligned longitudinally of the pacifying nipple, the liquid thermometer tube having a part of its main portion extending through said mouth-piece portion and frictionally extending through both apertures such that said liquid bulb portion is located exteriorly of said mouthpiece portion adjacent said outer end and the remaining part of said main portion of said thermometer tube extends exteriorly from the inner end of said mouthpiece portion, an elastic sleeve tightly engages over a substantial portion of the part of said thermometer tube extending within said mouthpiece portion, said elastic sleeve having an outer end disposed short of said liquid bulb portion, the marginal portion of the aperture at the outer end of said mouthpiece portion abutting against said outer end of said sleeve, and a transparent protector tube having an open end removably secured to said abutment flange and surrounding the temperature displaying main portion of said thermometer tube and having a closed end at its outer end engaged over the other end of the thermometer tube and wherein the aperture at the inner end of said mouthpiece portion forms an annular external bead, said inner end engages in a recess made in the aperture of said lip abutment flange, the latter being further integrally formed with an internally threaded sleeve portion axially projecting away from said mouthpiece portion and said protector tube is removably screwed within said internally threaded sleeve portion and abuts said bead and axially compresses the latter to cause the same to tightly engage said thermometer tube to prevent sliding of the thermometer tube relative to said lip abutment flange.

* * * * *